H. L. HOPKINS.
MOWING MACHINE.
APPLICATION FILED JUNE 18, 1903. RENEWED MAY 3, 1912.
1,051,409.
Patented Jan. 28, 1913.
3 SHEETS—SHEET 1.
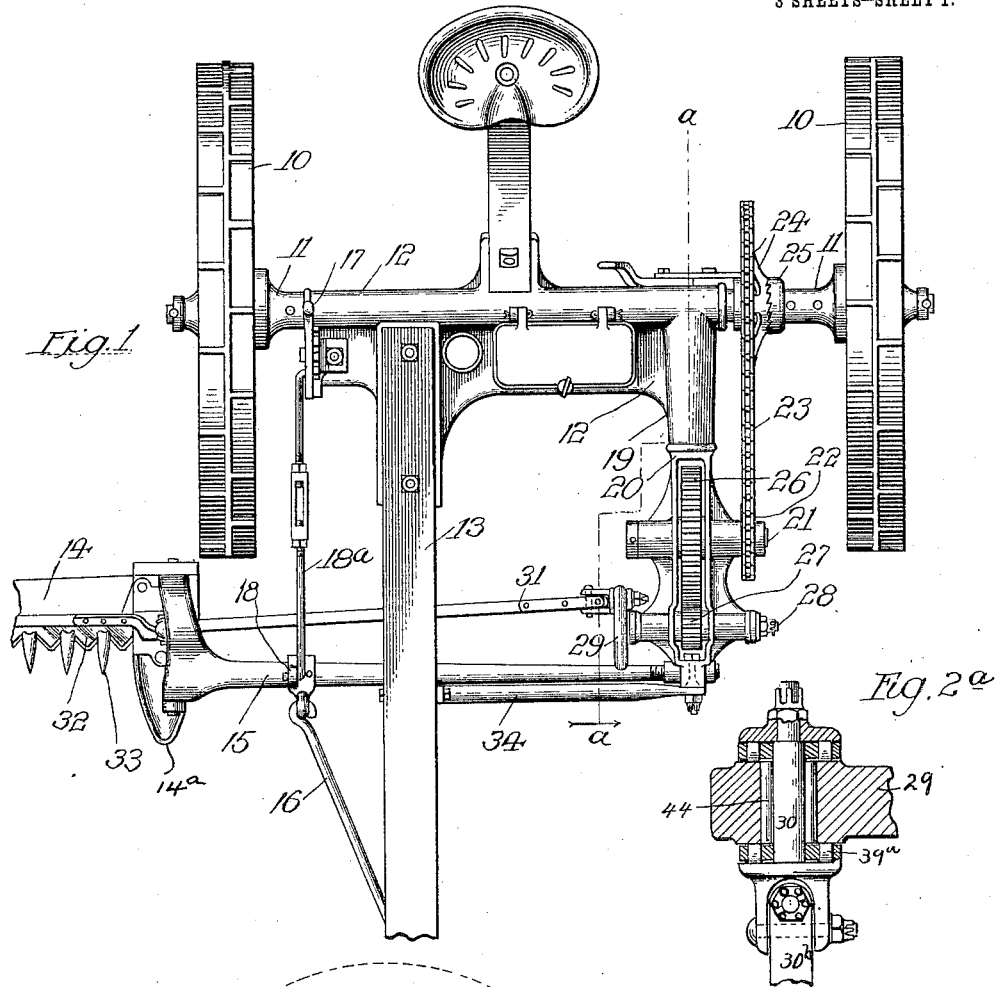
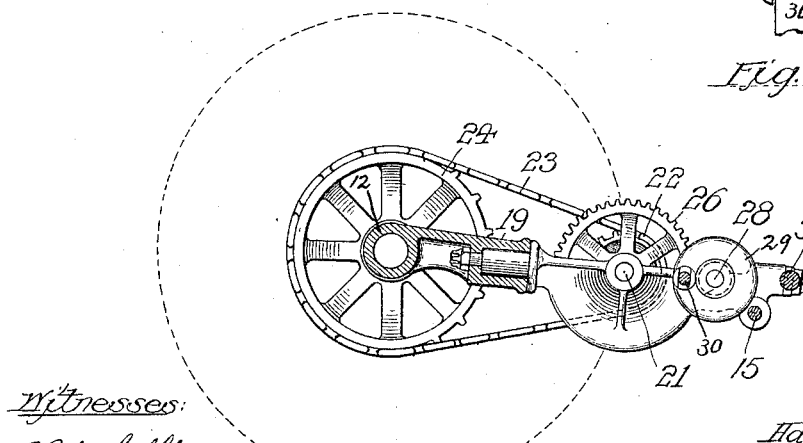

H. L. HOPKINS.
MOWING MACHINE.
APPLICATION FILED JUNE 18, 1903. RENEWED MAY 3, 1912.
1,051,409.
Patented Jan. 28, 1913.
3 SHEETS—SHEET 2.
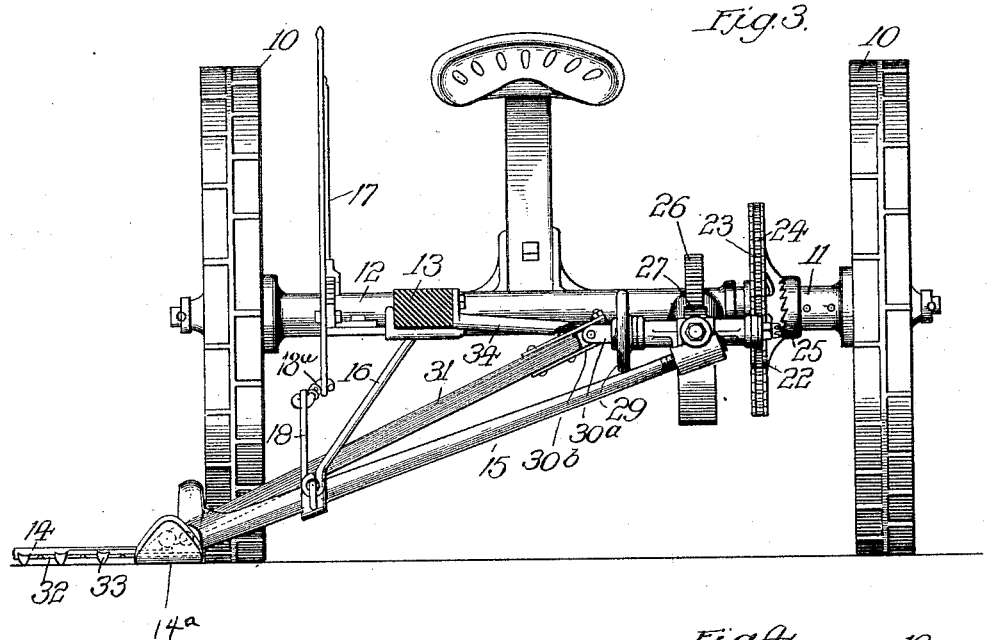
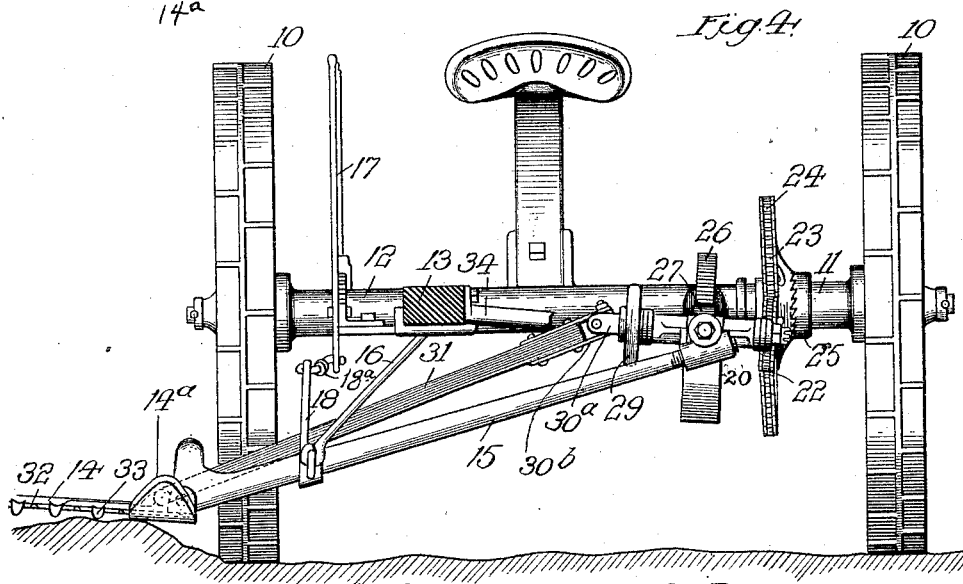
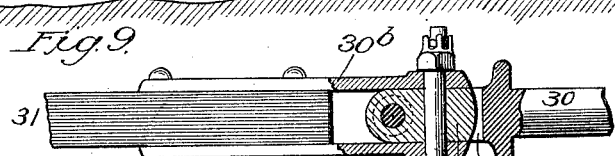
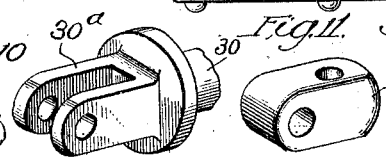

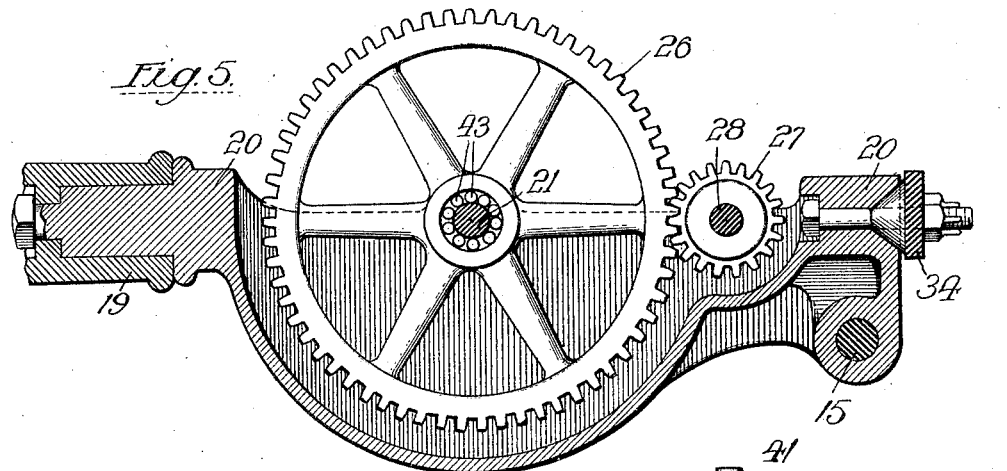
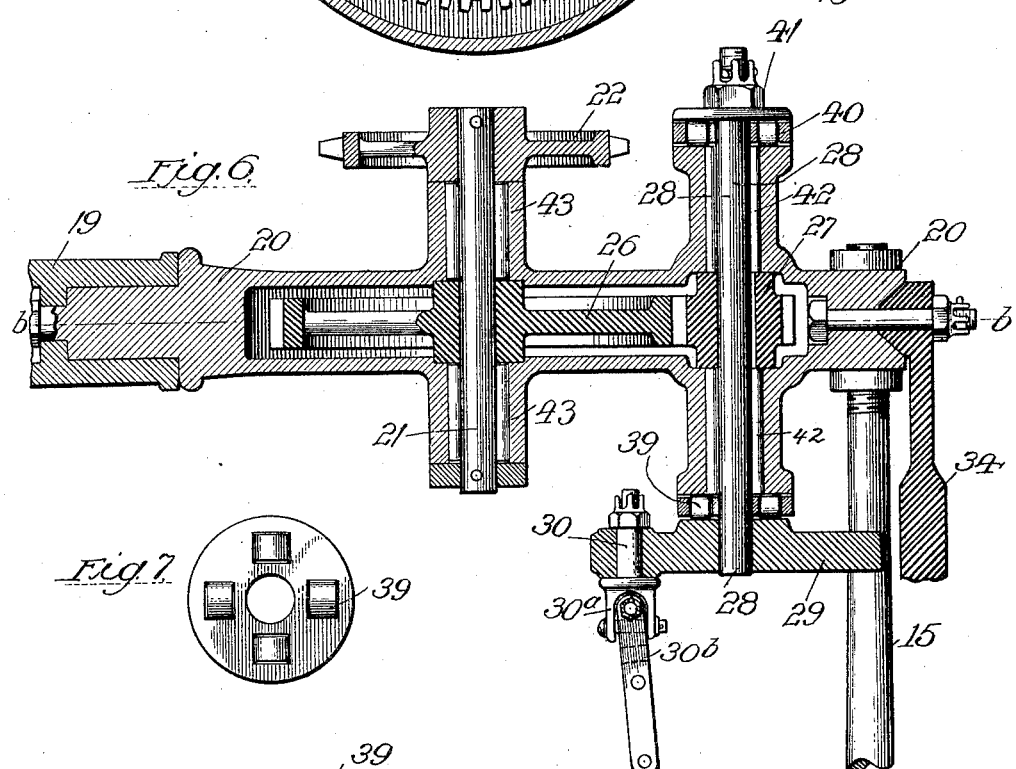
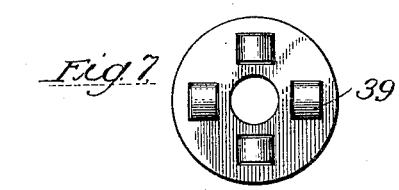
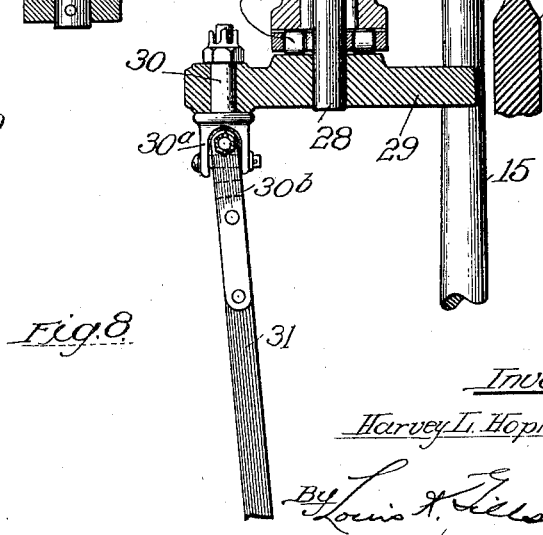

UNITED STATES PATENT OFFICE.

HARVEY L. HOPKINS, OF CHICAGO, ILLINOIS, ASSIGNOR TO HOPKINS PATENT COMPANY, OF CHICAGO, ILLINOIS, A CORPORATION OF ILLINOIS.

MOWING-MACHINE.

1,051,409. Specification of Letters Patent. Patented Jan. 28, 1913.

Application filed June 18, 1903, Serial No. 162,116. Renewed May 3, 1912. Serial No. 695,010.

*To all whom it may concern:*

Be it known that I, HARVEY L. HOPKINS, a citizen of the United States, and resident of Chicago, county of Cook, and State of Illinois, have invented certain new and useful Improvements in Mowing-Machines, of which the following is a specification, and which are illustrated in the accompanying drawings, forming a part thereof.

This invention relates to that type of mowing machines in which the crank driving the cutter bar rotates in a plane transverse to the line of reciprocation of the bar, such a machine being the subject of Letters Patent No. 645,395, granted to me March 13, 1900.

The machine covered by my former patent was of special design throughout and differed from the type of mowing machines now most commonly in use not only in the peculiar disposition of the cutter bar driving crank but in that the frame carrying the working parts of the machine was not rigidly connected with but was hinged to the frame to which the tongue of the apparatus was attached. That machine was made with the separate axle and tongue frames in order that the crank shaft might rise and fall with the shoe of the cutter bar, thereby tending to prevent disturbance of the normal angles of the pitman relatively as to the cutter bar so as to lessen variation in the range of movement of the knife.

The object of the present invention is to adapt the form of crank action disclosed in my former patent to the prevailing type of frame for mowers of the present date, commonly known as the rule joint machine, wherein the working parts of the machine and the tongue are mounted upon a single frame. This object has been attained by mounting the drive gearing of the crank shaft upon a portion of the frame, which is swiveled on a pivot transverse to the crank shaft, and connecting this frame with the shoe of the cutter bar by a rigid brace-rod, which while free to turn in the frame to permit of the tilting of the cutter bar serves as a crank arm for turning the frame on its swivel as the shoe moves up and down.

In the accompanying drawings Figure 1 is a detail plan view of the machine; Fig. 2 is a section on the line $a$—$a$ of Fig. 1; Fig. $2^a$ is a sectional view through the crank pin connection of the crank wheel, illustrating an arrangement of anti-friction bearings for the same; Figs. 3 and 4 are front elevations of the machine, some of the parts being shown in section and the parts being shown in different positions in the two figures; Fig. 5 is a detail longitudinal vertical section on the line $b$—$b$ of Fig. 6; Fig. 6 is a detail plan section of the crank mechanism; Figs. 7 and 8 are details of the roller bearing preferably used in the machine; and Figs. 9, 10 and 11 are details of the crank and pitman connection.

The mowing machine is mounted upon a pair of drive wheels 10, 10, carrying the axle 11, 11, upon which is sleeved the frame 12, 12. The tongue of the machine is shown at 13 and is bolted rigidly to the frame 12. The finger bar is shown at 14; the front brace rod, to which the finger bar is pivotally attached, is shown at 15; the draft link leading backwardly and downwardly from the tongue to the brace rod is shown at 16; the lever for tilting the cutting apparatus at 17, and the link connecting this lever with the crank arm 18 on the front brace rod is shown at $18^a$.

The frame 12 is provided with a forwardly projecting arm 19 located upon the opposite side of the machine from that upon which the cutting apparatus is located. A frame 20 projects forwardly from the arm 19 and is in swiveled engagement therewith. In suitable boxes in this frame there is journaled a shaft 21, normally parallel with the axle 11, and upon one end of this shaft is fixed a sprocket wheel 22, driven by means of a sprocket chain 23 from a wheel 24 running upon the axle of the machine and engageable therewith through the medium of any suitable clutch mechanism, as indicated at 25.

A spur gear wheel 26 is fixed upon the shaft 21 and is preferably housed within the frame 20. This gear wheel engages a pinion 27 fixed upon the crank shaft 28, which is parallel with the shaft 21 and is journaled in suitable boxes forming a part of the frame 20.

The crank wheel 29 is fixed upon the end of the shaft 28 and carries a crank pin 30, which is rotatable within the wheel and is attached to the pitman 31 by means of any suitable form of universal joint,—as shown by means of the yoke $30^a$ formed on the crank pin, the yoke straps $30^b$ projecting beyond the ends of the pitman and disposed at right angles to the arms of the yoke 30ª, and the block 30ᶜ fitting between and pivoted to the arms of both yokes. The pitman 31 is pivotally attached to the cutter bar 32, which coöperates with the guard fingers 33 carried by the finger bar 14, in the usual manner.

The crank shaft 28, while being parallel with the cutter bar when the latter is in its normal working position, is placed out of alinement therewith and preferably above its normal position. The elevation of the crank shaft is such that the pitman is inclined upwardly from the cutter bar when the crank is in its lowest position. In consequence of this disposition of the parts the cutter bar is at the end of its outstroke when the crank pin is at its lowest point, and as the crank turns through a half revolution, thereby raising that end of the pitman, the cutter bar is given its instroke.

The front brace rod 15 is hinged to the shoe 14ª so as to allow vertical flexure of the finger bar; but passes transversely through the frame 20 so that it acts as a crank arm for oscillating the same as the shoe 14ª rises and falls. The brace rod also serves as means for tilting the cutter bar, the tilting lever 17 being connected with it by means of the crank arm 18 on the brace rod and the link 18ª. In order that it may serve this purpose the brace rod is made free to turn in the frame 20, as shown, by being in threaded engagement with it. By reason of this crank arm connection between the shoe and the frame 20 through the medium of the brace rod 15 any vertical movement of the shoe, either actually or relatively as to the axle of the machine, turns the frame upon its pivot and hence the normal angular relation of the pitman 31 with the crank shaft and a uniform stroke of the cutter bar are maintained, and the registration of the cutter bar sections with the guard fingers is not disturbed. The effect of such vertical movement of the shoe is indicated in Fig. 4 of the drawings, which shows it as raised relatively as to the driving wheel due to inequalities in the ground. While this pivotal movement of the crank mechanism and the axle of the machine disturbs the parallelism of the wheels 22 and 24, in practice this change is never sufficient to throw the sprocket chain 23 from either wheel.

For added strength and rigidity I prefer to pivotally support the forward end of the auxiliary frame 20, and this is accomplished by means of a brace rod 34 rigidly attached to the tongue 13, and connected with the frame 20 by means of a pivot pin in line with its rear pivot.

Among the advantages of the construction herein illustrated and described may be mentioned the dispensing with beveled gears, which gears greatly increase the friction and are consequently short-lived; and especially the possibility of introducing ball or roller bearings for the crank shaft and crank pin and especially to take the thrust of the pitman. Any suitable form of such bearings may be employed. I prefer to use the form illustrated in detail in Figs. 7 and 8, and marked 39, placing such rollers between the crank wheel 29 and the end of the box within which the crank shaft is journaled and between the opposite end of this box and the nut 41 upon the end of the crank shaft, as shown at 40, the bearings 39 resisting the reaction of the cutter bar during its outward movement and the bearings 40 during its inward movement. I also show the crank shaft 28 as turning on rollers 42, and the shaft 21 as turning on rollers 43.

In Fig. 2ª I have illustrated an arrangement of anti-friction bearings for the crank pin 30, in which the bearings 39ª are arranged to take the longitudinal thrust thereof, while the pin turns between the anti-friction rollers 44.

While I have shown and described the invention as applicable to a mowing machine, it is, of course, capable of use in connection with any harvesting machine employing a reciprocating cutter bar, and hence it will be understood that I use the term mowing machine in its generic sense.

I do not herein claim broadly the main frame and the auxiliary gearing frame in combination with a gearing comprising the crank wheel and pitman, all arranged and related as set forth, as this subject-matter in its broader aspects is claimed in my co-pending application Ser. No. 246,533, filed February 20, 1905; nor do I herein claim the means shown for connecting the crank wheel and pitman, this subject-matter being claimed in another co-pending application, Ser. No. 556,787, filed April 21, 1910.

I claim as my invention—

1. In a harvesting machine, the combination with the main frame, the main axle, the cutting mechanism, the gearing for driving the cutting mechanism including a crank wheel that rotates in vertical planes parallel with the longitudinal movements of the harvester, a pitman connecting the crank wheel and the cutting mechanism, an auxiliary frame in which are the bearings for the crank wheel pivotally supported on an axis parallel with the longitudinal movements of the machine, and a rigid brace arm or rod between the said auxiliary frame and the shoe of the cutting mechanism, the connection with the latter being jointed to permit the finger bar of the cutting mechanism to be turned up on said joint, and the connection of the brace rod with the auxiliary frame permitting the brace rod to turn on its longitudinal axis while preventing an independent up and down movement thereof relative to the auxiliary frame, substantially as set forth.

2. In a harvesting machine, the combination of a main axle, a main frame pivoted on the main axle, a cutting mechanism, a gearing for driving the cutting mechanism comprising a crank wheel rotating in planes transverse to the longitudinal axis of the cutting mechanism and parallel to the lines of longitudinal movement of the harvester, a pitman connecting the crank wheel and cutting mechanism, an auxiliary frame in which the crank wheel is mounted pivotally connected to the main frame on an axis parallel to the longitudinal movements of the machine, and a rigid brace arm or rod connecting the auxiliary frame and the cutting mechanism, the rod having a folding joint connection with the cutting mechanism and a swiveling connection with said auxiliary frame, substantially as set forth.

3. In a mowing machine, in combination, a cutter bar and supporting shoe therefor, a pivoted frame having its axis transverse to the cutter bar, a crank shaft carried by the frame, a crank mounted on the shaft and turning in planes transverse to the cutter bar, a pitman connecting the crank and cutter bar, and a brace rod connecting the shoe and frame and being fixed against angular movement relatively to said frame.

4. In a mowing machine, in combination, an axle, a frame sleeved upon the axle, an auxiliary frame swiveled to the first-mentioned frame its axis being transverse to the axle, a crank shaft journaled in the auxiliary frame transverse to its axis, a cutter bar out of alinement with the crank shaft, a supporting shoe for the cutter bar, a brace rod connecting the shoe and the auxiliary frame and being fixed in the latter against angular movement relatively thereto, and a pitman connecting the crank and cutter bar.

5. In a mowing machine, in combination, an axle, a main frame, a tongue rigidly attached thereto, an auxiliary frame swiveled to the main frame its axis being transverse to the axle, a brace fixed to the tongue and pivotally engaging the forward end of the auxiliary frame, a cutter bar, a supporting shoe therefor, the shoe and auxiliary frame being connected to turn together about the axis of the latter, a crank-shaft carried by the auxiliary frame and journaled transverse to the axis thereof, a crank carried by the shaft and turning in a plane transverse to the cutter bar, and a pitman connecting the crank and cutter bar.

6. In a mowing machine, in combination, drive wheels, an axle rotating with the wheels, a main frame carried by the axle, an auxiliary frame pivotally attached to the main frame on an axis transverse to the axle, a shaft journaled in the auxiliary frame and carrying a sprocket wheel, a sprocket wheel on and driven by the axle, a sprocket chain connecting the two wheels, a crank shaft journaled in the auxiliary frame and intergeared with the before-mentioned shaft, a cutter bar reciprocating transversely to the plane of rotation of the crank of the crank shaft, connection between such bar and the crank, a supporting shoe for the cutter bar, and a brace rod connecting the shoe and the auxiliary frame and fixed to the latter against angular movement relatively thereto, substantially as described and for the purpose set forth.

HARVEY L. HOPKINS.

Witnesses:
Louis K. Gillson,
E. M. Klatcher.

---

Copies of this patent may be obtained for five cents each, by addressing the "Commissioner of Patents, Washington, D. C."